F. G. ALBORN.
BRAKE.
APPLICATION FILED MAR. 12, 1918.

1,400,340.

Patented Dec. 13, 1921.

SHEETS—SHEET 1.

Inventor:
Frans G. Alborn.
by Emery, Booth, Janney & Varney
Attys.

F. G. ALBORN.

BRAKE.

APPLICATION FILED MAR. 12, 1918.

1,400,340.

Patented Dec. 13, 1921.

Inventor:
Frans G. Alborn,
by Emery, Booth, Janney & Varney
Attys

F. G. ALBORN.
BRAKE.
APPLICATION FILED MAR. 12, 1918.

1,400,340.

Patented Dec. 13, 1921.

Inventor:
Frans G. Alborn.
by Curry, Bartlett, Penny & Curry
Att'ys.

UNITED STATES PATENT OFFICE.

FRANS G. ALBORN, OF MILFORD, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

BRAKE.

1,400,340. Specification of Letters Patent. Patented Dec. 13, 1921.

Application filed March 12, 1918. Serial No. 221,941.

*To all whom it may concern:*

Be it known that I, FRANS G. ALBORN, a citizen of the United States, and a resident of Milford, New Haven county, Connecticut, have invented an Improvement in Brakes, of which the following description, in connection with the accompanying drawings, is a specification, like characters on the drawings representing like parts.

This invention relates to brakes, and is more especially concerned with a brake mechanism of the class in which the brake drum is disposed longitudinally of a motor vehicle adjacent the rear end of the transmission housing, although the invention is by no means restricted to this class of work, but is susceptible of general application.

My invention will be best understood by reference to the following description, when taken in connection with the accompanying drawings of one specific embodiment thereof, while its scope will be more particularly pointed out in the appended claims.

In the drawings:

Fig. 7 is a sectional view on line 7—7 of Fig. 2.

Figures 1, 2:
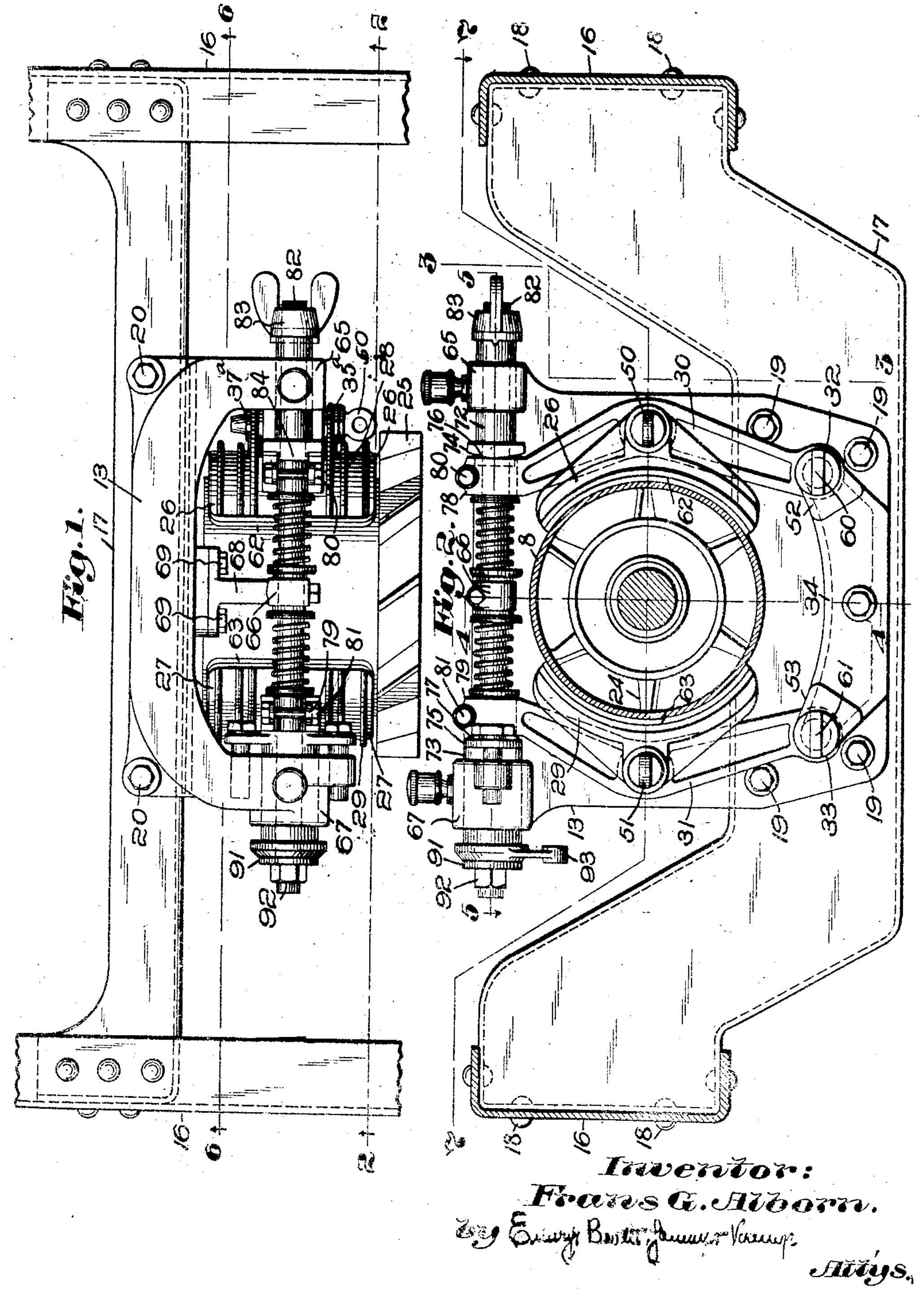
Figure 1 is plan of a brake mechanism embodying my invention.
Fig. 2 is a sectional view on line 2—2 of Fig. 1.

Referring to the drawings and to the embodiment of my invention which is illustrated therein, I have there shown, by way of exemplification, a brake mechanism comprising a brake drum 8, having a hub 9, secured to a shaft 10, the latter being mounted in a suitable bearing 11. The brake mechanism may be provided with any appropriate supporting means, but in the present example, I have shown a support comprising a bearing bracket 12, best shown in Fig. 6, comprising separable upper and lower parts 13 and 14, united by cap-screws 15. The lower part is mounted on a suitable frame-work which is herein the frame of a motor vehicle, the same comprising a pair of longitudinal frame members 16, and a transverse member 17, the latter being preferably in the form of an inverted arch having its ends secured, as by means of rivets 18, to the members 16, and having its central portion disposed below the axis of the brake drum 8. To this transverse member, the lower part 14 of the bearing bracket 12 is herein secured by a plurality of bolts 19, best shown in Fig. 6, and a plurality of bolts 20, best shown in Fig. 7. The described inverted mounting reduces the bending moment of the support, and presents a better resistance to torque stresses, as compared with other brake supports, and in addition, possesses the further advantage of affording a freer passage of air for cooling the brake drums and brake shoes, as will appear hereinafter.

Figure 4:
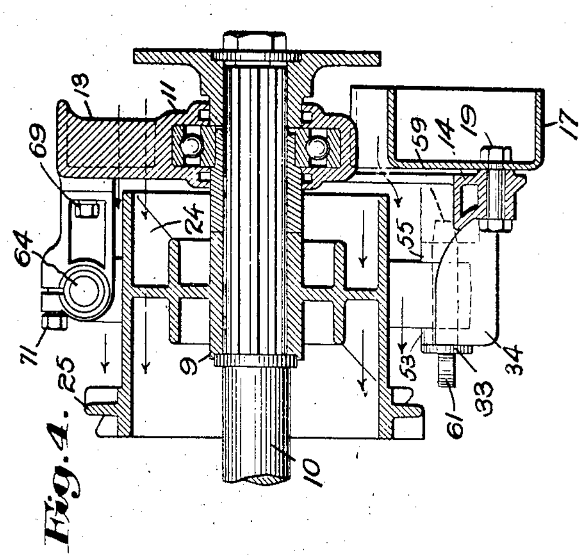
Fig. 4 is a sectional view on line 4—4 of Fig. 2.
Figure 6:
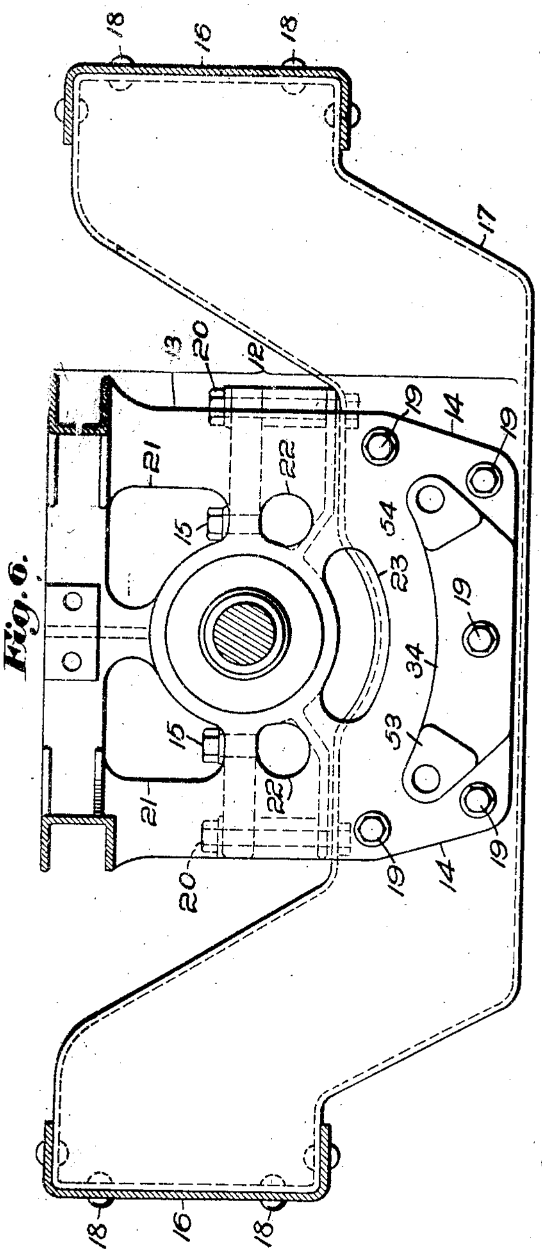
Fig. 6 is a sectional view on line 6—6 of Fig. 1.
Figure 6:
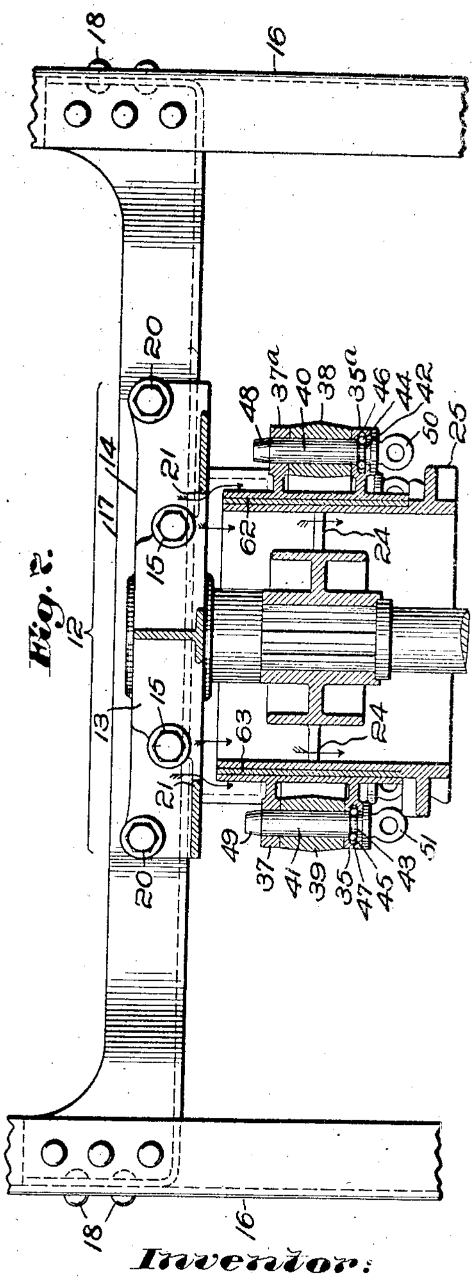

If desired, the bearing bracket 12 may have suitable provision to permit the flow of cooling air therethrough, in a fore-and-aft direction, and in the present example, I have shown said bracket provided with a plurality of apertures 21, 22, and 23, best shown in Fig. 6, in line with the brake-drum 8. The latter may be provided with any suitable means for inducing an air current to cool itself, and the brake shoes hereinafter described, but in the present example I have provided said brake-drum with inner fan blades 24, and outer fan blades 25, best shown in Fig. 4. Thus it will be seen that, by the rotation of the brake-drum, a current of air is constantly propelled within and without the brake-drum in an axial direction, thus producing a very desirable and highly efficient cooling effect. Since the axis of the brake-drum is disposed lengthwise of the vehicle, this effect is better aided by the forward motion of the vehicle.

Figure 3:
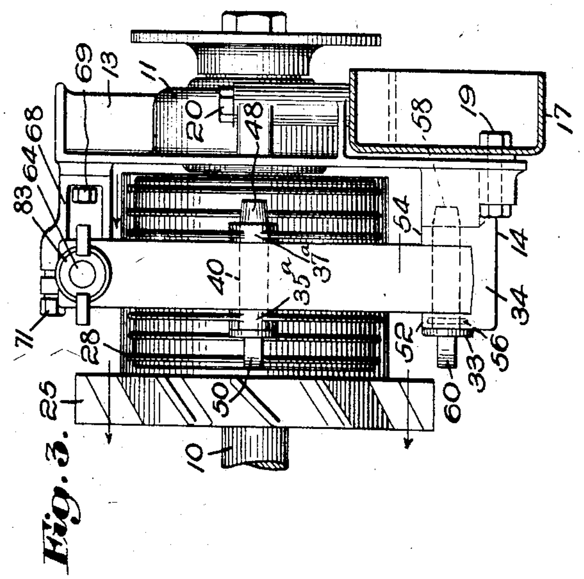
Fig. 3 is a sectional view on line 3—3 of Fig. 2.

Any suitable braking means may be provided to coöperate with the brake-drum 8. In the present instance, I have provided for this purpose a pair of brake-shoes 26 and 27, which may be and are herein provided with ribs 28 and 29, to increase their heat-radiating surfaces. The brake shoes are herein mounted on brake-shoe carrying levers 30 and 31, fulcrumed at 32 and 33 on a yoke 34, the latter projecting from the face of the lower part 14 of the bearing bracket 12, as best shown in Fig. 3. Preferably, the brake-shoes 26 and 27 are pivoted on the brake-shoe carrying levers 30 and 31, respectively, said shoes being herein provided for this purpose with ears 35, 35ª, 37 and 37ª, arranged in pairs, as best shown in Fig. 7, to receive between them ears 38 and 39, on the brake-shoes 26 and 27, respectively. Pivotal pins 40 and 41, passing through the ears of each set, detachably connect the brake shoes with their respective levers.

As a means to facilitate the instant removal and replacement of the pins 40 and 41, to permit the brake-shoes to be renewed, or relined, should occasion require, said pins are herein provided with circumferential grooves 42 and 43, to receive spring washers 44 and 45, the latter being seated in annular grooves 46 and 47 in the ears 34 and 35, respectively, the arrangement being such that, by the application of a sufficient amount of force in an endwise direction, the spring washers can be caused to yield and spring out of their respective grooves in the pins, thus permitting the latter to be withdrawn. To facilitate replacement of the pins, and expansion of the spring washers to receive them, said pins are herein provided with tapered terminal portions 48 and 49. Preferably, also, said pins have their heads provided, respectively, with eyes 50 and 51, to receive a suitable implement, such as a drift-pin, or rod, whereby a leverage may be exerted on the pins 40 and 41, to remove them from their places. Preferably, also, the pivotal pins 32 and 33 are constructed and arranged in an identical manner with relation to the levers 30 and 31, and yoke 34, the latter for this purpose being provided with pairs of ears 52, 53, 54 and 55, best shown in Figs. 3 and 4. In this case, also, the pins 32 and 33 are grooved to receive spring washers 56 and 57, and are provided with tapered terminal portions 58 and 59, and with eyes 60 and 61, to facilitate the removal and replacement of said pins. If desired, the brake-shoes may be provided, respectively, with renewable linings 62 and 63, best shown in Fig. 7.

Any suitable means may be provided for actuating the levers 30 and 31 to carry the brake-shoes 26 and 27 toward and from the brake-drum 8, thereby to apply and to release the brake. To this end, I have herein provided actuating mechanism including a brake-lever connecting rod 64, appropriately supported by the upper part 13 of the bearing bracket 12, the support being preferably afforded by guides 65, 66, and 67, on the part 13. In the present example, the guides 65 and 67 are formed integral with the part 13, while the guide 66 is formed as a part of a bracket 68, best shown in Fig. 1, secured to the part 13 by screws 69. The guide 66 may be, and is herein, provided with a bushing 70, secured in place by a clamping screw 71. In the present embodiment, the rod 64 is not mounted directly in the guides 65 and 67, but is carried by appropriate sleeves 72 and 73, which, in turn, are mounted to slide axially in the guides 65 and 67.

The sleeves 72 and 73 are preferably provided, respectively, with abutments 74 and 75, bearing against the upper terminal portions of the levers 30 and 31, and preferably said abutments are provided with convex faces 76 and 77, best shown in Fig. 2, to furnish rocking bearing surfaces for said levers. The latter are suitably mounted to swing away from each other when detached from the yoke 34, so as to facilitate the removal of the brake-shoes 26 and 27, without detaching the upper ends of said levers from the rod 64. To this end, the upper terminal portions of the levers are herein provided with pairs of ears 78 and 79, separated by slots best shown in Fig. 1, allowing a considerable freedom of movement of said levers on said rod. Preferably, bolts 80 and 81 are provided, connecting the ears of each pair in such a manner as to prevent the levers from being accidentally withdrawn from the rod. In other words, when the lower ends of the levers are disconnected from the yoke 34, said levers are held suspended on the rod 64.

Preferably, the rod 64 is mounted to slide axially in the sleeve 73, but carries the sleeve 72. Preferably, also, the latter is adjustably mounted axially on the rod, thereby to vary the distance between the abutments 74 and 75. To this end, one terminal portion of the rod is herein threaded as at 82 to receive a suitable nut 83, the latter being preferably of the type known as a wing-nut, which may be grasped by the fingers to turn the same. By this means, the effective distance between the brake-shoes 26 and 27 may be varied, thereby to regulate the braking effect. As a means to prevent the sleeve 72 from turning in the guide 65, when the nut 83 is turned, said sleeve is herein provided with a tongue 84, engaging the inner faces of the ears 78, as best shown in Figs. 1 and 2.

Figure 5:
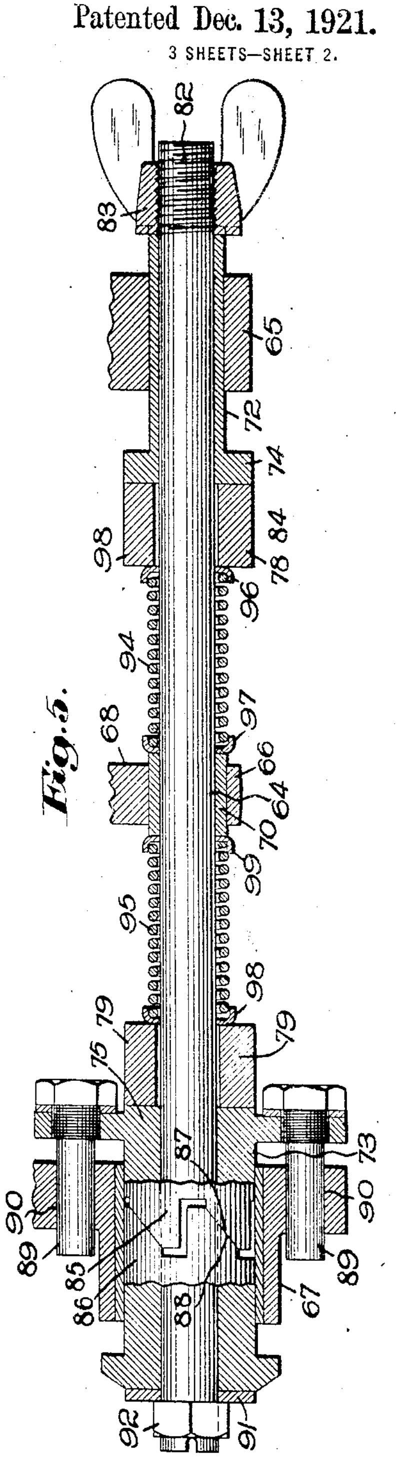
Fig. 5 is a sectional view on line 5—5 of Fig. 2.

I have herein provided a single actuating means for both brake-shoes said means preferably comprising relatively rotatable cams 85 and 86, having coöperating inclined planes 87 and 88, best shown in Fig. 5, so arranged that rotation of one cam relatively to the other moves the levers 30 and 31 toward each other. To this end, the cam 85 is formed on the sleeve 75, and the latter is held against rotation by appropriate means, herein comprising a pair of studs 89, carried by said sleeve, and mounted to slide in openings 90, provided in the guide 67, as best shown in Fig. 5. The cam 86, on the other hand, is mounted to turn, but is held against lengthwise displacement on the rod 64, by providing the latter with a suitable abutment, herein comprising a washer 91, held in place by a nut 92, threaded onto said rod. The cam 86 is herein in the form of a sleeve, which may have any suitable provision whereby the same may be rotated, said sleeve to this end being herein provided with an arm 93, best shown in Fig. 2.

It should now be apparent that, by rotating the cam 86 in the proper direction, the described coöperating inclined faces will act to move the sleeve 73, and the rod 64, relatively in opposite directions, thus causing the abutments 74 and 75 to approach each other. When this occurs, the levers 30 and 31 are moved toward each other, and the brake shoes 26 and 27 are caused to press against the brake-drum 8. As a means for releasing the brake, I have herein provided two helically coiled springs 94 and 95, encircling the rod 64, and interposed between the ears 78 and 79 and the intermediate guide 67. If desired, cup-shaped abutments 96 and 97 may be provided for the spring 94, and similar abutments 98 and 99 may be provided for the spring 95.

From the foregoing, it is now evident that the described brake-actuating means automatically equalizes the thrust, and applies pressure equally to the brake-shoes 26 and 27. On the other hand, when the pressure is released, the brake-shoes are independently restored to their respective initial positions by the independent springs 94 and 95. It should here be observed that these springs serve to maintain the coöperative engagement of the inclined faces 87 and 88. It should also be noted that the sleeves 73 and 86 are free to move axially within the guide 67. This makes the entire brake-actuating mechanism a floating structure, whose location is determined by the brake-drum itself; hence there is bound to be perfect equalization and even distribution of the pressures.

While I have herein shown and described one specific form or embodiment of my invention, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

Claims:

1. In a brake-mechanism, the combination of a brake-drum, a pair of oppositely disposed brake-shoes coöperating therewith, a pair of brake-shoe carrying levers, a support on which said levers are fulcrumed, a brake-lever connecting rod supported by said support, a pair of brake-lever carrying abutments mounted on said support, one to slide lengthwise of said rod, brake-shoe releasing means urging said levers toward said abutments, and brake-shoe applying means including coöperating inclined planes to move said rod and one of said abutments relatively to the other thereby to carry said brake-levers toward each other and said brake-shoes toward said brake-drum.

2. In a brake mechanism, the combination of a brake-drum, a pair of oppositely disposed brake-shoes coöperating therewith, a pair of brake-shoe carrying levers, a support on which said levers are fulcrumed, a brake-lever connecting rod supported by said support, a pair of brake-lever carrying abutments mounted on said support, one to slide lengthwise of said rod, brake-shoe releasing means urging said levers toward said abutments, and brake-shoe applying means including relatively rotatable cams having coöperating inclined planes to move said rod and one of said abutments relatively to the other thereby to carry said brake-levers toward each other and said brake-shoes toward said brake-drum, and means coöperating with said support to hold one of said cams against rotation.

3. In a brake mechanism, the combination of a brake-drum, a pair of oppositely disposed brake-shoes coöperating therewith, a pair of brake-shoe carrying levers, a support on which said levers are fulcrumed, a brake-lever connecting rod supported by said support, a pair of brake-lever carrying abutments mounted on said support, one to slide lengthwise of said rod, brake-shoe releasing means urging said levers toward said abutments, brake-shoe applying means including relatively rotatable cams having coöperating inclined planes to move said rod and one of said abutments relatively to the other, thereby to carry said brake-levers toward each other and said brake-shoes toward said brake-drum, one of said cams being carried by said sliding abutment, and means coöperating with said support to hold said abutment against rotation.

4. In a brake mechanism, the combination of a brake drum, a pair of oppositely disposed brake shoes coöperating therewith, a pair of brake-shoe carrying levers, a support on which said levers are fulcrumed, a brake-lever connecting rod, a pair of brake-lever carrying abutments, one slidable lengthwise of said rod, separate brake-shoe releasing springs between the levers urging them toward said abutments, an abutment between the springs mounted to slide on the rod but having means for securing it in position thereon and brake-shoe applying means including coöperatively inclined planes to move said rod and one of said abutments relatively to the other thereby to carry said brake levers toward each other and said brake shoes toward said brake-drum.

5. The mechanism as defined in claim 4 wherein a member transverse to the axis of the brake drum provides a common support for the levers, rod and abutments.

6. In a brake mechanism, the combination of a brake drum, a pair of oppositely disposed brake shoes coöperating therewith, a pair of brake-shoe carrying levers, a support on which said levers are fulcrumed, a brake-lever connecting rod, a pair of brake-lever carrying abutments, separate brake-shoe releasing springs between the levers urging them toward said abutments, an abutment between the springs mounted to slide on the rod but having means for securing it in position thereon and brake-shoe applying means for causing relative approach of the abutments lengthwise of the rod.

7. In a brake mechanism, the combination of a brake drum, a pair of oppositely disposed brake shoes coöperating therewith, a pair of brake-shoe carrying levers, a support on which said levers are fulcrumed, a brake-lever connecting rod, bearings for the rod, brake-shoe releasing means acting on the levers and brake-shoe applying means including an abutment on the rod and a coöperating cam, said abutment and cam being housed in one of said bearings.

8. In a brake mechanism, the combination of a brake-drum, a pair of oppositely disposed brake-shoes coöperating therewith, a pair of brake-shoe carrying levers, a support on which said levers are fulcrumed, a brake-lever connecting rod supported by said support, a pair of brake-lever carrying abutments mounted on said support, one to slide lengthwise of said rod, brake-shoe releasing means urging said levers toward said abutments, brake-shoe applying means including relatively rotatable cams having coöperating inclined planes to move said rod and one of said abutments relatively to the other thereby to carry said brake-levers toward each other and said brake-shoes toward said brake-drum, and a third abutment carried by said rod, said cams being interposed between said third abutment and said sliding abutment.

9. In a brake mechanism, the combination of a brake drum, a support, a pair of oppositely disposed brake levers, pivotal supporting means therefor at one end of the support, bearings at the opposite end of the support, a lever connecting rod in said bearings and means associated with said rod and having a part received in one of said bearings for effecting relative approach of the levers lengthwise of the rod.

10. The mechanism as defined in claim 9 wherein the support is in the form of a yoke providing an open portion alining with the drum and wherein the drum is provided with means for forcing air substantially axially thereof.

11. In a brake mechanism in combination, a brake drum, a brake-supporting frame comprising a pair of members extending longitudinally of the axis of said drum on opposite sides of the same and an arched transverse member connecting said longitudinal members, pivoted brake levers carried by said transverse member and adapted to close on said drum substantially in line with said longitudinal members and means for operating the levers.

12. In a brake mechanism in combination, a brake drum, a brake-supporting frame comprising a pair of members extending longitudinally of the axis of said drum on opposite sides of the same and an arched transverse member connecting said longitudinal members, a bracket upheld by said transverse member, a pair of oppositely disposed brake levers pivoted at one end of the bracket, and a rod carried by the other end and having means associated therewith cooperating with said levers for operating the same, said levers being adapted to close on said drum substantially in line with said longitudinal members.

13. In a brake mechanism, the combination of a brake-drum, brake means coöperating therewith, brake-operating means, and a brake-supporting frame comprising a pair of members extending longitudinally of the axis of said brake-drum, and a transverse member secured at its ends to the longitudinal members on opposite sides of said drum and having a downwardly offset central portion below the axis of said drum.

14. In a brake mechanism, the combination of a brake-drum having means for propelling air in a generally axial direction, brake means coöperating with said brake-drum, and brake-drum supporting means apertured in line with said brake-drum to permit the flow of such air.

15. In a brake mechanism, the combination of a brake-drum having means for propelling air in a generally axial direction, brake means coöperating with said brake-drum, and brake-drum supporting means including a beam extending transversely of and beneath said brake-drum, and a brake-drum bearing bracket secured to said beam and apertured in line with said brake-drum to permit the flow of such air.

16. In a brake mechanism, the combination of a hollow brake-drum having means for propelling air within and without said drum in a generally axial direction, brake means coöperating with said brake-drum, and brake-drum supporting means apertured in line with said brake-drum to permit the flow of such air.

17. In a brake mechanism, the combination of a brake-drum, a pair of brake-shoes coöperating therewith, a pair of brake-shoe-actuating levers, a pair of brake-shoe pivots detachably connecting said brake-shoes and levers, a brake-shoe lever support, a pair of brake-lever pivots detachably connecting said levers to said support, and a brake-actuating lever connecting rod on which said levers are mounted to swing away from each other when detached from said support, whereby said brake-shoes may be detached from said levers.

18. In a brake mechanism, the combination of a brake-drum, a pair of brake-shoes coöperating therewith, a pair of brake-shoe-actuating levers provided with connecting-rod receiving slots, a pair of brake-shoe pivots detachably connecting said brake-shoes and levers, a brake-shoe lever support, a pair of brake-lever pivots detachably connecting said levers to said support, and a brake-actuating lever connecting rod disposed in said slots and on which said levers are mounted to swing away from each other when detached from said support, whereby said brake-shoes may be detached from said levers.

In testimony whereof, I have signed my name to this specification.

FRANS G. ALBORN.